United States Patent [19]

Suzuki

[11] Patent Number: 5,409,347
[45] Date of Patent: Apr. 25, 1995

[54] CARRYING AND POSITIONING ROBOT

[75] Inventor: Nobuyoshi Suzuki, Shizuoka, Japan

[73] Assignee: Heian Corporation, Shizuoka, Japan

[21] Appl. No.: 36,670

[22] Filed: Mar. 25, 1993

[51] Int. Cl.6 ............................................. B25J 15/06
[52] U.S. Cl. .................................... 414/737; 414/752; 294/65; 901/40
[58] Field of Search ............ 414/729, 737, 752; 294/64.1, 65; 901/29, 40

[56] References Cited

U.S. PATENT DOCUMENTS

| 2,960,364 | 11/1960 | Herzog | 294/65 |
| 4,411,574 | 10/1983 | Riley | 294/65 X |
| 4,629,385 | 12/1986 | Irie | 901/29 X |
| 4,946,335 | 8/1990 | King et al. | 294/65 X |

FOREIGN PATENT DOCUMENTS 0116488  5/1990  Japan ....................... 901/40

Primary Examiner—Donald W. Underwood
Attorney, Agent, or Firm—Burgess, Ryan & Wayne

[57] ABSTRACT

A connecting member is connected to a working arm of a robot body, a first member is fixed to the connecting member and a second member is attached to the first member to move in one direction. A first cylinder is attached to the second member to rectify the motion of the first member to the second member and a base member is attached to the second member to move at a right angle to the motion of the first member. A second cylinder is attached to the base member for rectifying the motion of the second member to the base member. Supporting bars are attached to the base member and a plurality of suction pads are attached to the supporting bars.

3 Claims, 5 Drawing Sheets

CARRYING AND POSITIONING ROBOT

BACKGROUND OF THE INVENTION

The present invention relates to a carrying and positioning robot in which any object regardless of its size can be carried and can be positioned in a predetermined position.

Generally, in a robot having a plurality of suction pads connected to a suction device, the suction pads are opened to the air, a base is directly connected to an arm of the robot, and supporting bars are connected to the base and the suction pads are attached to the supporting bars.

In such a robot, when the suction device is started, all of the suction pads suck the air. Therefore, if all of tile suction pads are not touching the object to be carried, the suction pads which are not touching the object suck the air. As a result the sucking power in the suction pads which are touching the object are weakened and the object may fall.

Also, because the base having the suction pads is connected to the arm of the robot directly, if the base of the robot is not correctly moved to a predetermined position, the object is not carried to the predetermined position correctly.

SUMMARY OF THE INVENTION

It is, therefore, the primary object of the present invention to provide a carrying and positioning robot which can carry any object regardless of the size of the object.

It is another object of the present invention to provide a carrying and positioning robot in which a carrying object sucked by the suction pads of the robot is simply positioned.

In order to accomplish the above and other objects, the present invention comprises a connecting member connected to a working arm of a robot body, a first member fixed to the connecting member, a second member which is attached to the first member to move one way, a first cylinder for rectifying the motion of the first member to the second member, a base member which is attached to the second member to move at a right angle to the motion of the first member, a second cylinder for rectifying the motion of the second member to the base member, supporting bars attached to the base member and a plurality of suction pads attached to the supporting bars, each of the suction pads being provided with a valve room having a large main connecting hole and a small connecting hole connected to a suction device and a valve body putting in the valve room to move up and down and to close the large main connecting hole in the suction of the suction device.

DESCRIPTION OF THE PREFERRED EMBODIMENTS

Figure 1:
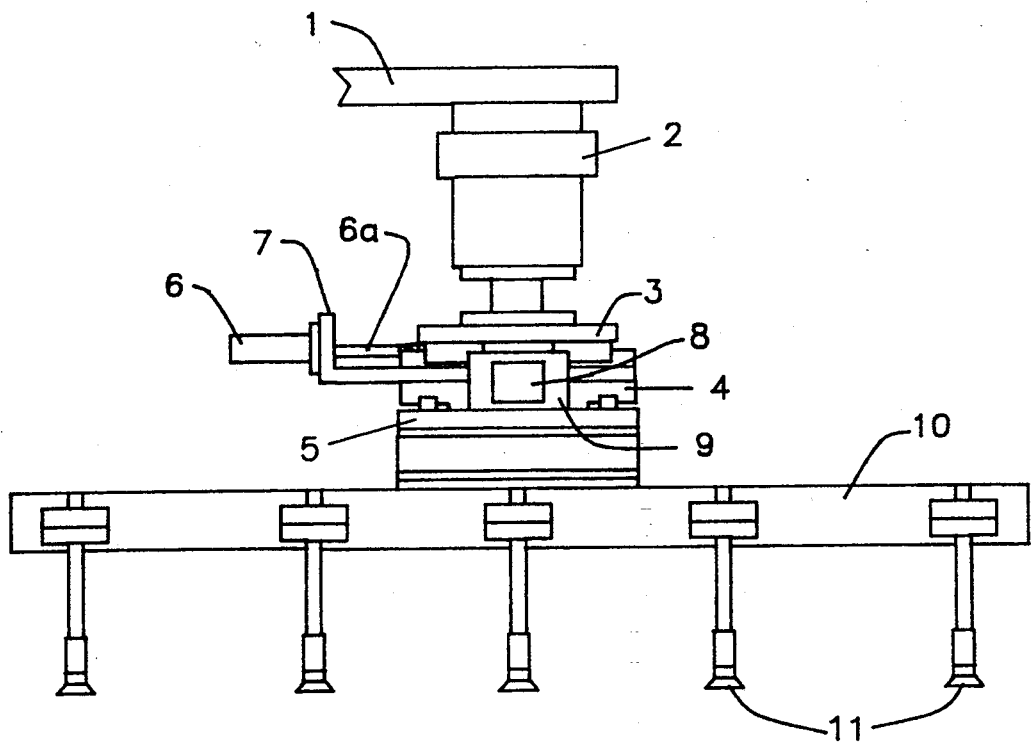
FIG. 1 shows a front view of a carrying and positioning robot of an embodiment of the present invention.
Figure 2:
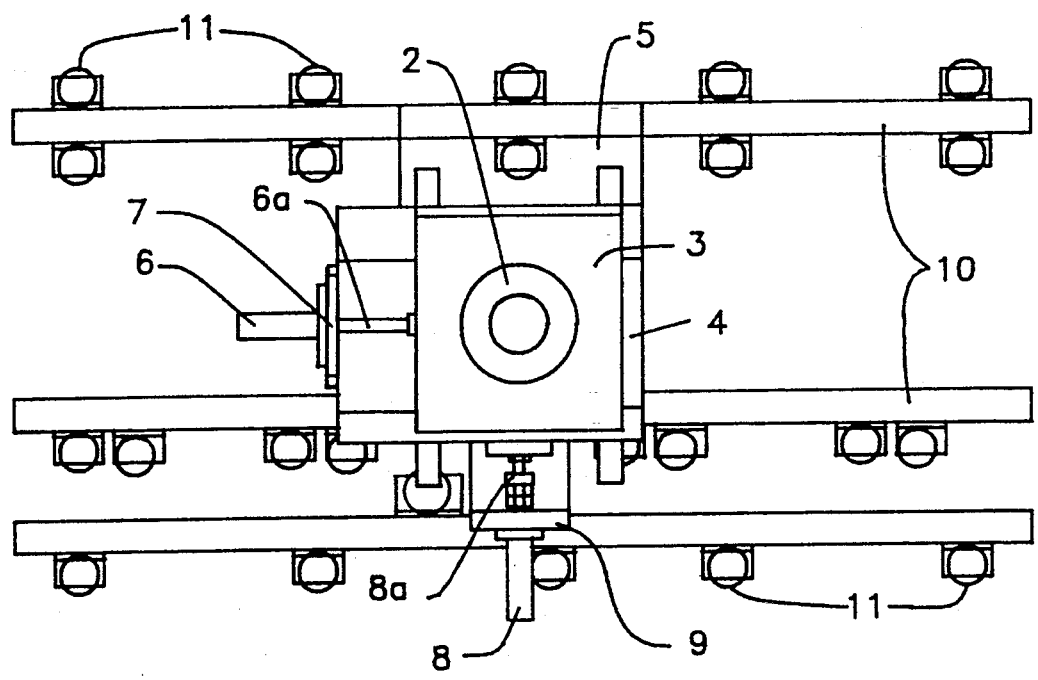
FIG. 2 shows a plan view of the carrying and positioning robot in FIG. 1.

Referring to FIGS. 1 and 2, a connecting member 2 is connected to a working arm 1 of a robot, and a first member 3 is fixed to the connecting member 2. A second member 4 is attached to the first member 3 to move one way, and a base member 5 is attached to the second member 4 to move at a right angle to the motion of the second member 4.

A working shaft 6a of a first cylinder 6 is connected to the first member 3, the first cylinder 6 is fixed to a supporting member 7 which is an extended portion of the second member 4 and the working shaft 6a permits movement of the first member 3 in one direction relative to the second member 4. Furthermore, a working shaft 8a of a second cylinder 8 is connected to the second member 4 and the working shaft 8a permits movement of the second member 4 relative to the base member 5. Three supporting bars 10 are fixed to the base member 5 and a plurality of suction pads 11 are attached to the bars 10.

Figure 3:
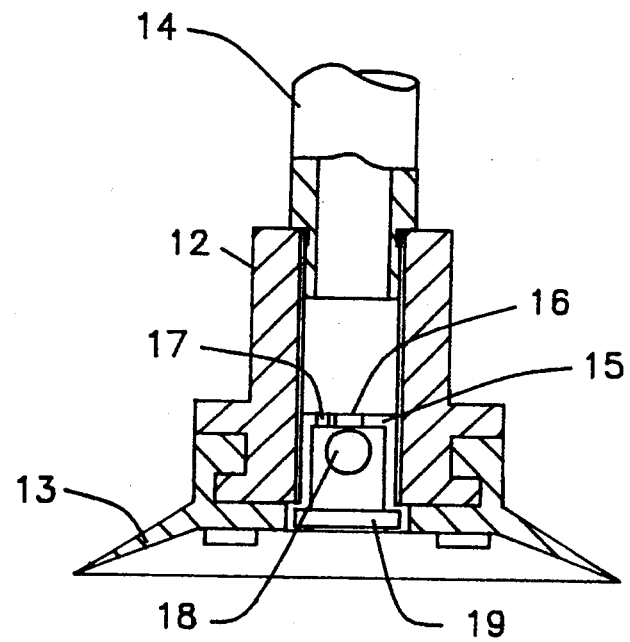
FIG. 3 shows a sectional view of a suction pad in the carrying and positioning robot in FIG. 1.

As shown in FIG. 3, the suction pad 11 has a pad body 12, a pad member 13 which is attached to the under portion of the pad body 12 and a tube member 14 which is connected to a suction apparatus (not shown).

A valve chamber 15 is formed in the pad body 12, a large connecting hole 16 and a small connecting hole 17 are formed in a wall of the valve chamber 15 and are connected to the tube member 14, a ball valve 18 is inserted into the valve chamber 15 and a stopper 19 is so attached to the under portion of the valve chamber 15 that the ball valve 18 remains in the valve chamber 15.

In such pad 11, when the suction apparatus is started, the air is sucked from the large main connecting hole 16 and the small connecting hole 17 in the valve chamber 15. Whereby, since the pressure in the valve chamber 15 becomes low, as shown in FIG. 3, the large main connecting hole 16 is closed by the rising of the ball valve 18, the small connecting hole 17 is opened to the air and the air is sucked.

Figure 4:
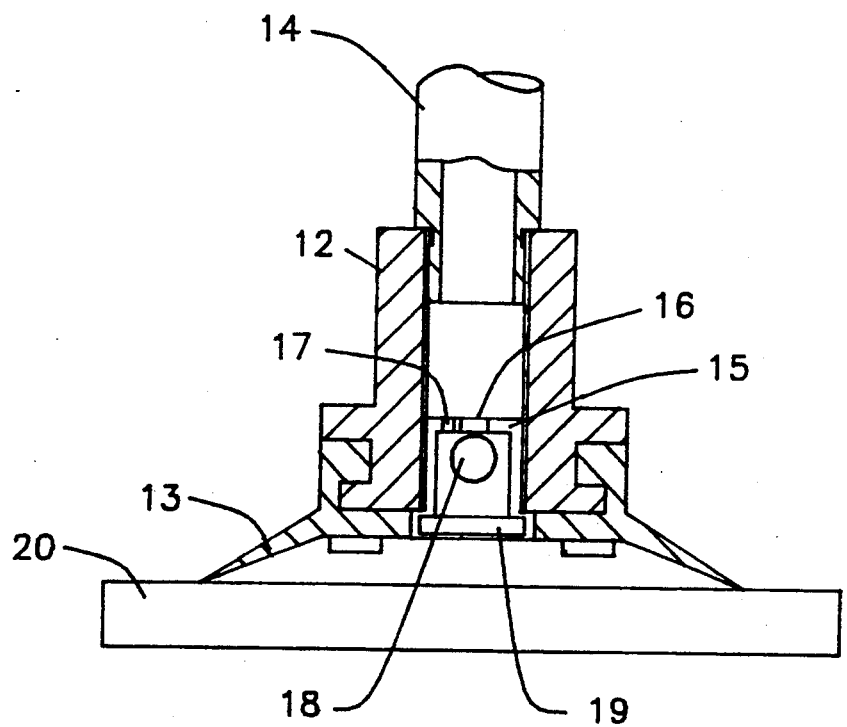
FIG. 4 shows a sectional view for showing a suction pad in the operable condition of the embodiment shown in FIG. 3.

As shown in FIG. 4, when the pad member 13 is touching an object to be carried 20, the air in the valve chamber 15 and between the pad member 13 and the carry object 20 is sucked from the small connecting hole 17. Accordingly the pressure in the valve chamber becomes low gradually and when it becomes the same as that in the tube member 14, the ball valve 18 falls on the stopper 19 and the carry object 20 is sucked by the suction of the large main connecting hole 16 and the ball 18 in the suction pad 11 which is not touching to the carry object 20 rises to close the large main connecting hole 16.

Therefore, when one of the suction pads 11 is touching the carry object 20, the carry object 20 is sucked by the suction pad 11. Also, the suction pressure in the suction pad 11 which is touching the carry object 20 is the same as the suction pressure in the suction pad 11 which is not touching and the carry object 20 which is sucked by the suction pads 11 does not fall and can be carried.

Figure 5:
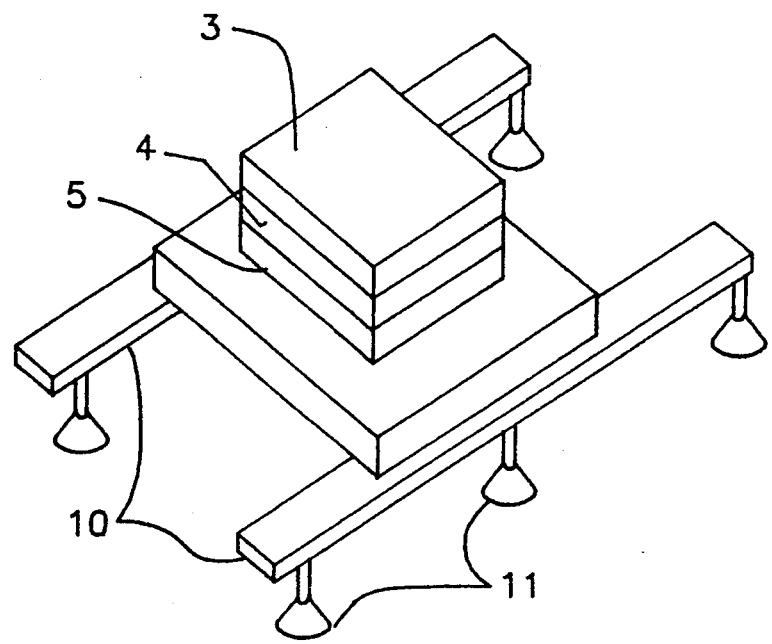
FIG. 5 shows a perspective view for showing a carrying formation of the robot in FIG. 1.

In the above robot, the positioning of the carry object 20 sucked by the suction pads 11 of the robot, is shown in FIG. 5. The first member 3 and the second member 4 are not moved by the cylinders 6 and 8 in the state for carrying the carry object 20.

Figure 6:
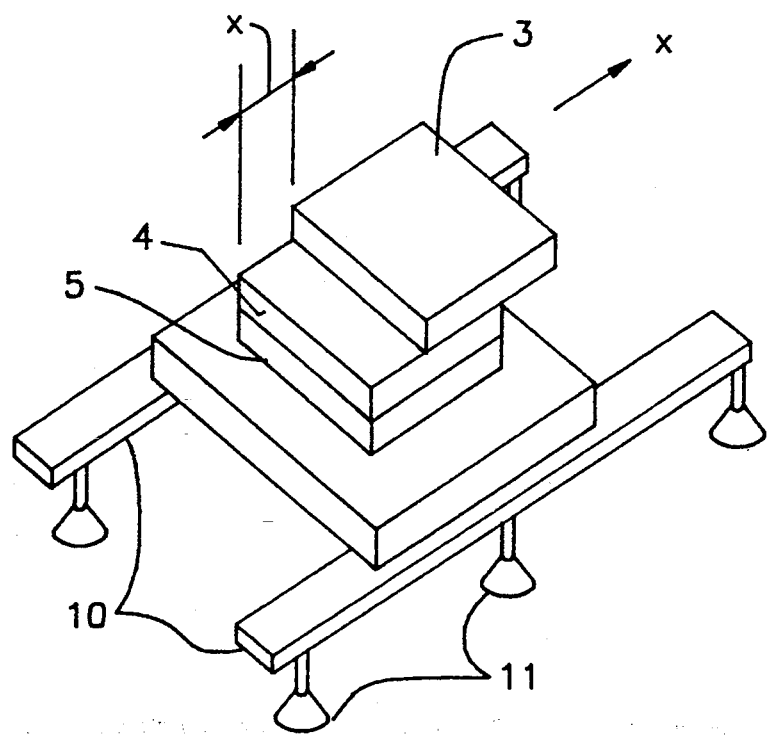
FIG. 6 shows a perspective view for showing one motion of the robot in FIG. 1.

When the carry object 20 sucked by the suction pads 11 is carried to the predetermined position and is touching a positioning stopper (not shown) for rectifying the motion of the X direction of the carry object 20, the inclination of the carry object 20 to the positioning stopper is rectified by the rotation of the connecting member 2 and as shown in FIG. 6, the first member 3 is shifted from the base member 5 by shifting the working arm 1 of the robot in opposition to the cylinder 6 only a distance x in the direction X and the carry object 20 is positioned by pushing the positioning stopper.

Figure 7:
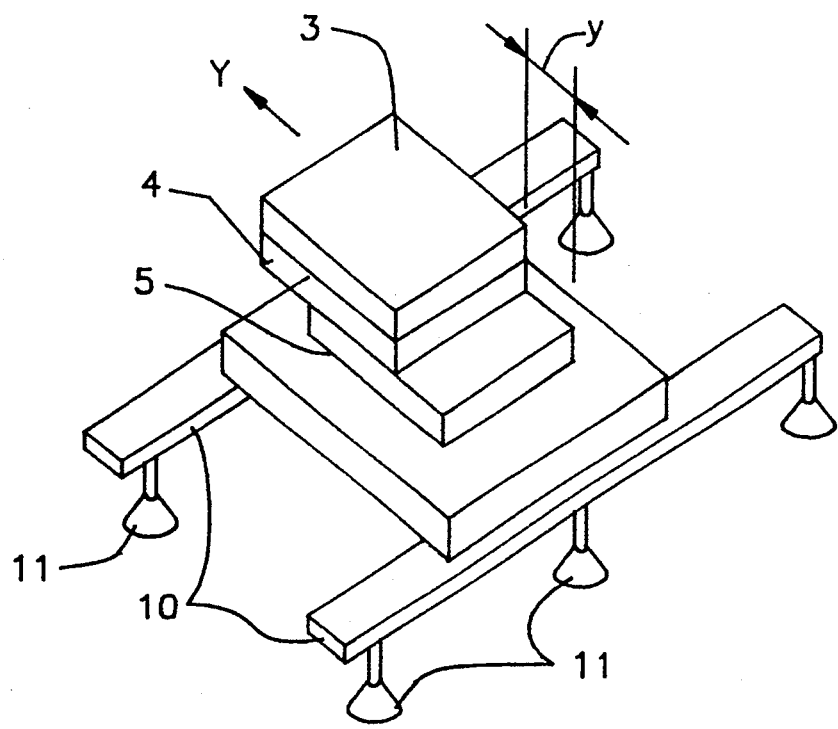
FIG. 7 shows a perspective view for showing one motion of the robot in FIG. 1.

In the same manner as the above, when the carry object 20 sucked by the suction pads 11 is carried to the predetermined position and is touching a positioning stopper (not shown) for rectifying the motion of the Y direction of the carry object 20, as shown in FIG. 7, the first member 3 is shifted from the base member 5 by shifting the working arm 1 of the robot in opposition to the cylinder 8 only a distance y in the direction Y and the carry object 20 is positioned by pushing the positioning stopper.

As explained above, the robot in the present invention can carry the carry object 20 regardless of the size thereof because the large main connecting hole 16 in the suction pads 11 except the suction pads 11 sucking the carry object 20 are closed by the ball valves 18. The carry object 20 is positioned at the predetermined position by shifting the working arm 1 over the predetermined position because the first and second members 3 and 4 are attached between the connecting member 2 of the working arm 1 of the robot and the base member 5 and are rectified by the cylinders 6 and 8.

Figure 8:
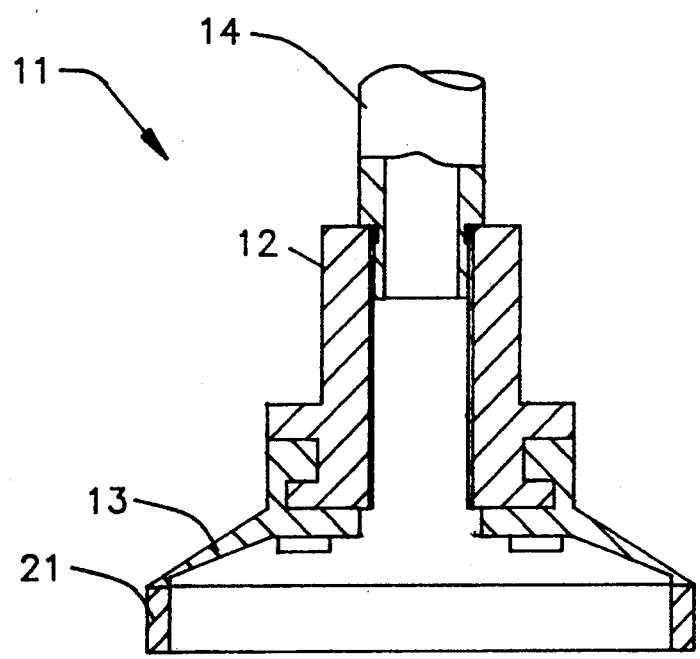
FIG. 8 shows a sectional view of a suction pad of the other embodiment of the present invention.

In a perspective view of the suction pad of the other embodiment of the present invention as shown in FIG. 8, 11 designates a suction pad, 12; a pad body, 13; a pad member and 14; a tube member and these constructions are the same as those of the above embodiments and an explanation thereof is omitted. Elements 15-19 are now shown in FIG. 8 for the sake of clarity, but the same construction as shown in FIG. 3 with respect thereto is included in pad 11. In this embodiment, a soft member 21, which restores to the original state after being pushed, is attached to the under portion of the pad member 13.

Figure 9:
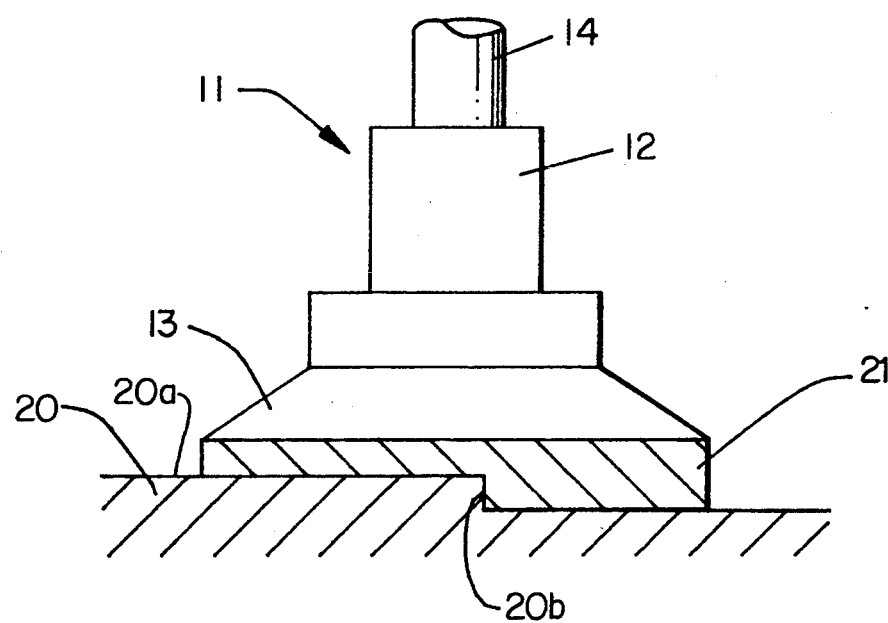
FIG. 9 shows a front view for showing a formation for sucking an object to be carried having different levels on the upper face of the object by the pad in FIG. 8.

In the suction pad in this embodiment, as shown in FIG. 9, when the carry object 20 has a flat portion 20a and a step-shaped portion 20b, the soft member 21 is contracted in the suction of the flat portion 20a and the soft member 21 is transformed in accordance with the step-shaped portion 21b to close the gap between the the step-shaped portion 20b and the soft member 21. Accordingly, because the gap between the step-shaped portion 20b and the soft member 21 is not formed and the air doesn't leak, the carry object 20 is carried by this robot.

Even if the surface of the carry object 20 is uneven, since the soft member 21 of the suction pad 11 is transformed in accordance with the uneven portion, the air doesn't leak from the portion between the uneven portion of the carry object 20 and the soft member 21.

This soft member 21 can use rubber foam, urethane foam, vinyl chloride foam or any high contractive and wear-resistant material having a restoring force without air-leakage.

As stated above, in the robot of the present invention, since a plurality of suction pads are attached to the supporting bars, even if some suction pads are not touched to the carry object, the robot in the present invention can carry the carry object. Also, since the base member is attached through the first and second members to the connecting member, the carry object can be positioned at a predetermined position by moving the working arm of the robot over a predetermined distance.

What is claimed is:

1. A carrying and positioning robot comprising:
   a connecting member connected to a working arm, a first member fixed to the connecting member, a second member movably attached to the first member, said first and second members being moveable in a first direction with respect to each other from a first position, first cylinder means, connected between said first member and said second member, for permitting movement between the first member and the second member in said first position relative to each other, a base member which is movably attached to the second member, said second member and said base member being moveable in a second direction with respect to each other from a second position, said second direction being at a right angle to the first direction, a second cylinder means, connected between said second member and said base member, for permitting movement between the second member and the base member in said second position relative to each other, a plurality of supporting bars attached to the base member, a plurality of tube members connected with the supporting bars, a plurality of suction pads connected through tube members to a suction device, each suction pad including a valve chamber having a stationary large main connecting hole and an adjacent stationary small connecting hole, each hole being connected through the respective tube member to the suction device, and a valve body including a ball member within the valve chamber and adapted to move up and down in response to a change in air pressure so as to close the large main connecting hole upon operation of the suction device.

2. A carrying and positioning robot as set forth in claim 1 wherein each suction pad includes a pad member at a lower end thereof for touching an object to be carried, and each said pad member includes a soft member, which restores to an original state after being pushed, at an under portion of the pad member.

3. A carrying and positioning robot as set forth in claim 2 wherein the soft member is made from a material selected from the group consisting of rubber foam, urethane foam and vinyl chloride foam.

* * * * *